April 2, 1946.     R. M. GRAMS     2,397,855
PNEUMATIC FLY SPRAYER
Filed Dec. 4, 1944
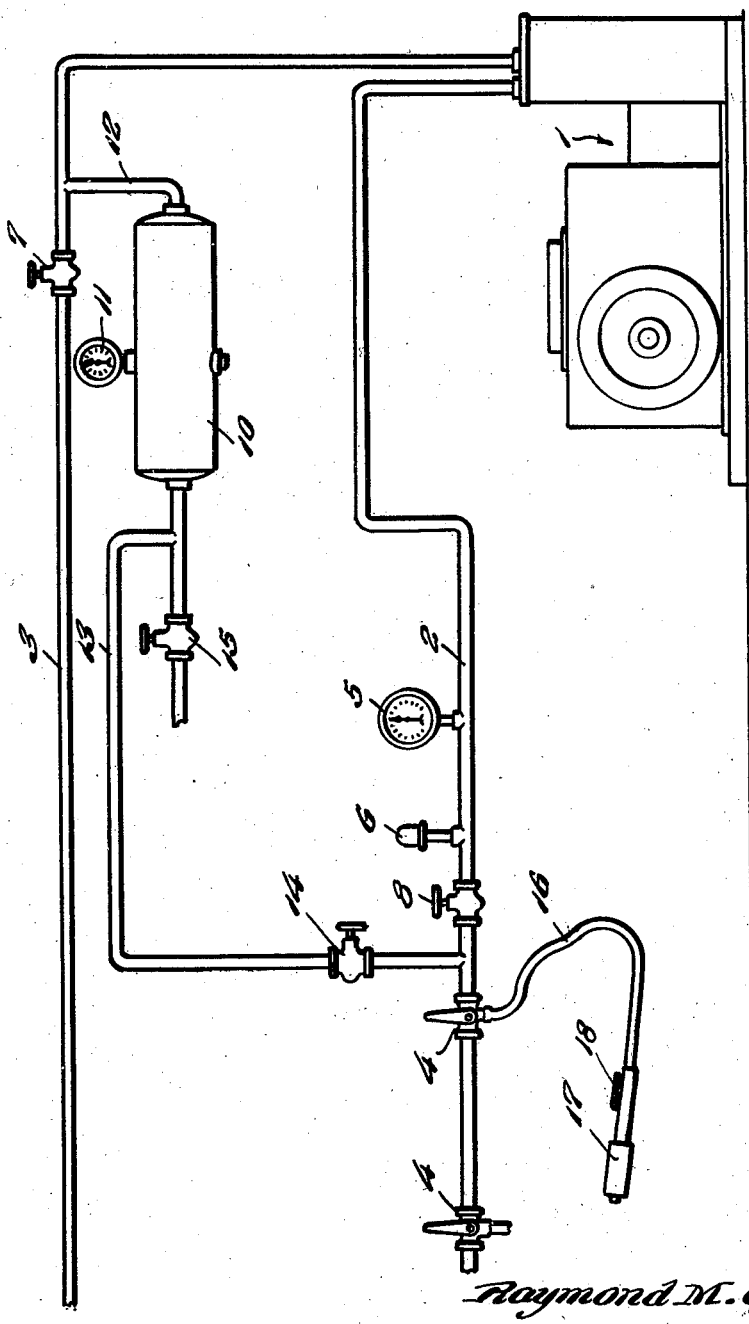
Inventor
Raymond M. Grams
By Clarence A. O'Brien
and Harvey B. Jacobson
Attorneys Patented Apr. 2, 1946

2,397,855

UNITED STATES PATENT OFFICE 2,397,855

PNEUMATIC FLY SPRAYER

Raymond M. Grams, Deerbrook, Wis.

Application December 4, 1944, Serial No. 566,587

2 Claims. (Cl. 119—159)

My invention relates to improvements in pneumatic fly sprayers for use especially in cow stables, and the like, to eliminate the fly nuisance during milking and interference with milking caused by flies disturbing the cows.

The primary object of my invention is to equip the usual commonly used vacuum milking apparatus for converting the same temporarily into a pneumatic sprayer so that the apparatus may be used, at will, to spray the cows singly, as desired, prior to milking and then converted back into a milking apparatus for use in the usual manner, all without materially complicating the apparatus or sacrificing operating efficiency in the same.

Other and subordinate objects are also comprehended by my invention, all of which, together with the precise nature of my improvements, will be readily understood when the succeeding description and claims are read with reference to the drawing accompanying and forming a part of this specification.

In said drawing:

The single figure is a diagrammatic view illustrating my invention in a preferred embodiment thereof.

Referring to the drawing by numerals, my invention has been shown therein as embodied in a well known type of vacuum line milking apparatus, conventionally illustrated, in part, as sufficient for the present purposes, and which comprises, as its basic element, a motor-operated vacuum pump 1. A vacuum milking pipe line 2 extends from one side of the pump 1 and a pressure line 3 from the other side thereof. The vacuum milking line 2, as will be understood, is adapted to extend past a series of cow stalls, not shown, and has interposed therein so-called "stall" cocks 4 spaced along the line and adapted for coupling to milking units, not shown, to open said line to said units for use in the different stalls. The vacuum milking line 2 is provided with the usual vacuum gauge 5 and release safety valve 6 between the series of cocks 4 and the pump 1.

According to my invention, a pressure cut-off valve 7 is provided in the pressure line 3, and a similar vacuum cut-off valve in the vacuum line 2 in advance of the gauge 5 and safety valve 6. A storage pressure tank 10 with a pressure gauge 11 therein is coupled at one end thereof to the pressure line 3 by a branch inlet pressure line 12 leading from said line 3 from a suitable point between the pressure cut-off valve 7 and the pump 1. A pressure discharge line 13 extends from the other end of said tank 10 to the vacuum line 2 and opens into the same in advance of the vacuum cut-off valve 8. A pressure control valve 14 is provided in said line 13 and a pressure relief bleed valve 15 is suitably connected in the line 13 adjacent the tank 10.

A flexible sprayer hose 16 is provided for each cock 4 for coupling thereto in any suitable manner in lieu of the beforementioned milking unit, not shown. Each sprayer hose 16 terminates in a sprayer nozzle 17 equipped with a thumb-operated control valve 18. The sprayer nozzle 17 is designed, in any suitable manner, to contain a fluid for destroying flies and to be sprayed out of the nozzle by air pressure. Such nozzles and liquids being well known, it has not been deemed necessary to disclose a specific nozzle or liquid therefor.

Referring now to the operation of the described invention. Ordinarily, as will be understood, in this class of milking apparatus the vacuum cut-off valve and the stall cocks 4 are closed, a vacuum is present in the vacuum milking line 2 and pressure in the pressure line 3. To convert the milking apparatus into a pneumatic sprayer, a sprayer hose 16 is attached to each "stall" cock 4, while, of course, the latter is closed, the pressure cut-off valve 14 closed, likewise the vacuum cut-off valve 8 and the pressure bleed valve 15. Thus, the apparatus is conditioned for building up pressure in the tank 10 by shunting pressure from the pressure line 3 into said tank. The pressure built up in the tank 10 may be determined by means of the gauge 11 and regulated by the pressure bleed valve 15. By opening the pressure control valve 14 and the "stall" cocks 4, air under pressure is introduced to the spray lines 16 and nozzles 17 for spraying operations and under control of the valves 18 of said nozzles 17. To reconvert the apparatus back to a milking equipment, it is merely necessary to detach the sprayer hoses 16, open valve 7, close valve 14 and open valve 8, as will be clear. As will be seen, my improvements provide means for shunting, at will, pressure from the pressure line 3 into the vacuum line 2 to transform that part of said line 2 in which the cocks 4 are located into a pressure line, and equipping the usual "stall" cocks with sprayer lines and nozzles.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. The combination with the vacuum pump of a milking machine, a vacuum line to said pump having a series of cocks interposed therein, and a pressure line from said pump, of sprayer lines for attachment to said cocks, sprayer nozzles on said sprayer lines, means to shunt pressure from the pressure line into said vacuum line at a point intermediate said series of cocks and said pump, and means to close the vacuum line between said point and said pump.

2. The combination with the vacuum pump of a milking machine, a vacuum line to said pump having a series of cocks interposed therein, and a pressure line from said pump, of sprayer lines for attachment to said cocks, sprayer nozzles on said sprayer lines, means to shunt pressure from the pressure line into said vacuum line at a point intermediate said series of cocks and said pump, and means to close the vacuum line between said point and said pump, the first-mentioned line comprising a storage tank for air under pressure, a pressure discharge line from said tank to said vacuum line, a branch line from the pressure line to said tank, and a pressure cut-off valve in said pressure line.

RAYMOND M. GRAMS.